US008995659B2

(12) United States Patent  
Sobel

(10) Patent No.: US 8,995,659 B2  
(45) Date of Patent: Mar. 31, 2015

(54) PARAMETERIZED RANDOM DATA GENERATOR PROVIDING A SEQUENCE OF BYTES WITH UNIFORM STATISTICAL DISTRIBUTION

(71) Applicant: Prem Sobel, San Diego, CA (US)

(72) Inventor: Prem Sobel, San Diego, CA (US)

( * ) Notice: Subject to any disclaimer, the term of this patent is extended or adjusted under 35 U.S.C. 154(b) by 86 days.

(21) Appl. No.: 13/914,412

(22) Filed: Jun. 10, 2013

(65) Prior Publication Data

US 2014/0362986 A1 Dec. 11, 2014

(51) Int. Cl.
G06F 21/00 (2013.01)
H04L 9/08 (2006.01)

(52) U.S. Cl.
CPC .................. *H04L 9/0869* (2013.01)
USPC ........................................................ 380/44

(58) Field of Classification Search
None
See application file for complete search history.

(56) References Cited

U.S. PATENT DOCUMENTS

| 7,174,355 | B2* | 2/2007 | Henry et al. | 708/250 |
| 7,526,707 | B2* | 4/2009 | Stroud et al. | 714/750 |
| 2004/0096060 | A1* | 5/2004 | Henry et al. | 380/46 |
| 2009/0060180 | A1* | 3/2009 | Schneider | 380/46 |
| 2012/0250863 | A1* | 10/2012 | Bukshpun et al. | 380/278 |

* cited by examiner

*Primary Examiner* — Jeffrey Pwu
*Assistant Examiner* — William Corum, Jr.
(74) *Attorney, Agent, or Firm* — Continuum Law; Robert P. Cogan

(57) ABSTRACT

A random data generator, a method, and a non-transitory machine-readable medium each operate a plurality of random number generators. Each random number generator is coupled to receive inputs comprising seed numbers, and generates an output stream of n-bit numbers. A bit-swap module receives each n-bit number and reorders the bits of the n-bit number to provide a reordered n-bit number. A byte select circuit selects a byte from the reordered n-bit number and provides a selected byte as an output to the random data stream.

21 Claims, 15 Drawing Sheets

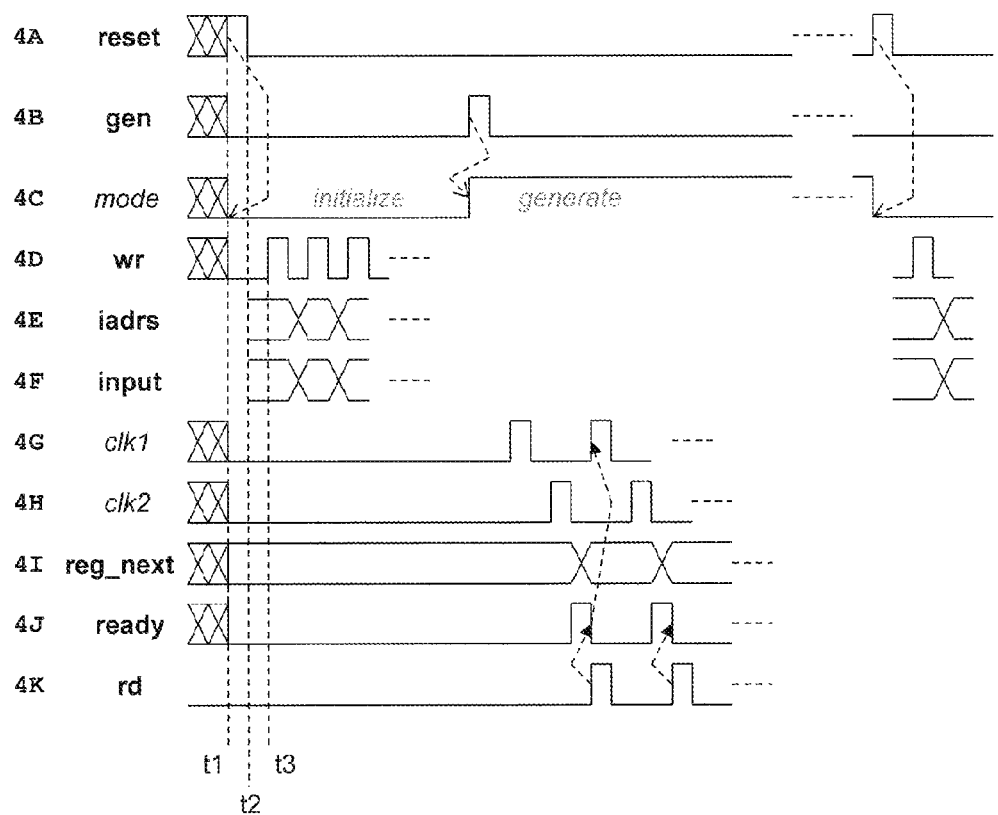
FIG. 4 Timing Diagram

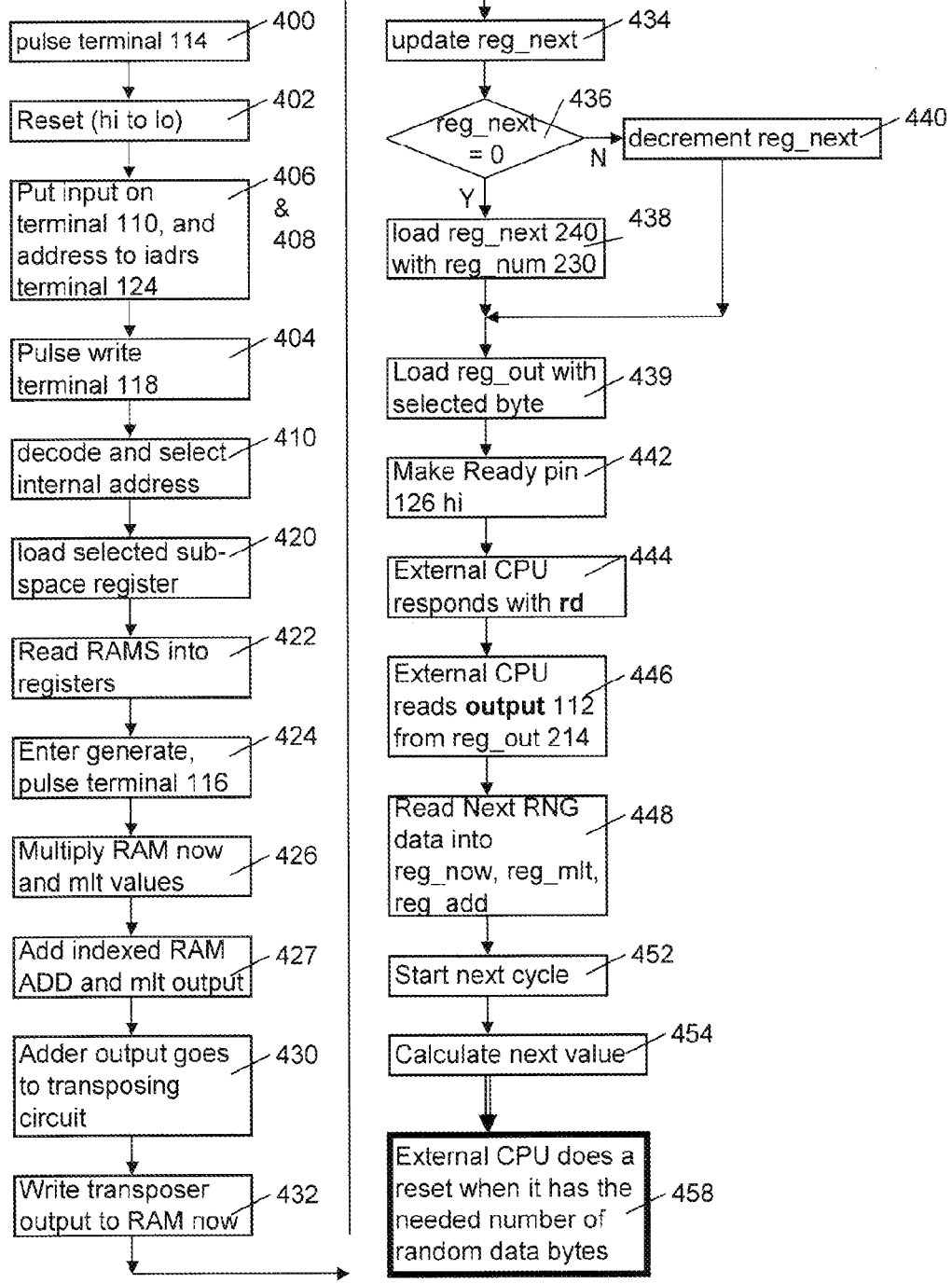

Bit-Flip (Bit-Swap)
Transposing circuit

Byte Select

PARAMETERIZED RANDOM DATA GENERATOR PROVIDING A SEQUENCE OF BYTES WITH UNIFORM STATISTICAL DISTRIBUTION

CROSS REFERENCE TO RELATED APPLICATIONS

This patent application claims priority of Provisional Patent Application 61/658,263 filed Jun. 11, 2012.

BACKGROUND OF THE INVENTION

1. Field of the Invention

The present subject matter relates generally to random number generation including generation of a random byte stream with uniform statistical properties.

2. Related Art

Random number generation is critically important in many areas. For example, generation of random numbers is a crucial element of maintaining data security. Many different forms of encryption are available to use in conjunction with random number generation. True random number generation can be used to make it practically impossible for an attacker to unscramble digital messages. However, to the extent that the random number generator produces results that are deterministic, vulnerability of encryption increases.

As sophistication of encryption has increased, the sophistication of attackers has steadily increased. Extremely complex encryption systems have been broken. Widely-used existing encryption algorithms such as DES, SSL, and RSA have been broken.

There are many different forms of encryption which each rely on random number generation. The everyday significance of the ability to provide a random number stream is illustrated by a research project reported in the New York Times in 2012, http://www.nytimes.com/2012/02/15/technology/researchers-find-flaw-in-an-online-encryption-method.html?_r=3&hp=&pagewanted=print#. Researchers examined a random number generation system which was a building block of encryption systems used worldwide for online shopping, banking, e-mail, and other Internet services intended to remain private and secure. The researchers discovered that in a small but significant number of cases, the random number generation system failed to work.

In the particular encryption system examined by the researchers, a user first creates and publishes the product of two large prime numbers, in addition to another number, to generate a public "key." The original numbers are kept secret. To encrypt a message, a second person employs a formula that contains the public key. In practice, only someone with knowledge of the original prime numbers can decode that message. The secret prime numbers must be generated randomly.

The researchers examined public databases of 7.1 million public keys used to secure e-mail messages, online banking transactions, and other secure data exchanges. They used the Euclidean algorithm to find the greatest common divisor of two integers in order to examine public key numbers. They found that approximately 27,000 keys were not truly random and provided essentially no protection against an attacker. An attacker could determine the underlying numbers, or secret keys, used to generate the public key using the same methods as the researchers. Many other keys were weak.

The researchers did not determine why the random number generators had produced imperfect results. However, it was seen that the problem appeared in the work of a number of sophisticated software developers. Widespread vulnerability exists which may go undetected until an adverse event occurs.

A form of random number generator that has come in to wide use is the multiply-with-carry random number generator of George Marsaglia. *Journal of Modern Applied Statistical Methods* 2(1)2-12 (2003), http://www.jmasm.com/journal/2003_vol2_no1.pdf. Many pseudorandom keys may be generated. However, the generated numbers tend to "band." The statistical distribution of the byte stream produced is not uniform. Consequently the byte stream is at least to some degree deterministic, creating vulnerability. Post processing of generated values is required to improve statistical properties. An initial byte stream with uniform statistical distribution is not provided.

SUMMARY

Briefly stated, in accordance with the present subject matter a set of size num_r random number generators is provided to cyclically generate a random byte stream having good statistical properties. The num_r random number generators may comprise one physical random number generator operated over num_r operating cycles. The value of num_r is stored in a register operatively coupled to the random number generator. "Good statistical properties" is a defined term and refers to qualities such as uniform statistical distribution. The generated byte stream cyclically takes a byte from each of the num_r random number generators.

Each random number generator, RNG[k], is provided with an initial set of three values, called now[k], mlt[k], add[k] (where k is the range 0 to num_r−1). Each number in the three RAM array is n bits wide, e.g., n=32. Num_r must be less than the physical number of entries in the generator. The new value for now[k] is as follows: now[k]=bit_swap(now[k]*mlt[k]+add[k]), thus the generated value replaces the previous value of now[k]. A number in each of the three registers (now[k], mlt[k], add[k]) has $2^n$ possible values. If n=32, the number of possible generated streams for each RNG is $2^{3*32*nbs}$, where nbs is the number of implemented bit_swap cases. Additionally, a sequence comprising num_r cycles may be provided, e.g., num_r=3, in which the number generator runs through m cycles, each cycle beginning with different initial input information. This structure and method provide $2^{3*n*nbs*num\_r}$ possibilities for the device.

Each data stream contains many keys or files. The portion of the data stream that is selected to comprise a key or file is selected by the encryption algorithm. Each output word, the new now[k], is reordered by a bit swapping (or bit flip) unit. The reordering may be accomplished in a hard-wired translating device, by switching circuits in response to decoded input signals, or by switching which is performed in a processor in response to a software program. The reordering is effective in preventing "banding" of number generator outputs. Subsets of successive output byte streams may be selected for use as successive random numbers. For n=32, there are 32! (32 factorial) possible bit swaps to choose from: 32!=263,130,836,933,693,530,167,218,012,160,000,000.

In a byte selector, a subset of y bits, e.g., y=8 bits, is selected from the n-bit number (n=32 in the current embodiment). The byte selector provides an output sequence which is size bytes long, where size is determined by the external controlling CPU. Each byte has $2^y$ possible values. For y=8, there are 256 possible values.

In the encryption application, a key or password is a sequence of bytes extracted from any random data sequence chosen by a user, which may be written to any file or to memory. Random data generators provided in accordance with the present subject matter create data streams, or files, in which a key or password is embedded.

The system could generate, for example, varying data (e.g., key or password) lengths up to 2 GB or more. Such variable length keys have billions times billions "nb" times, e.g., $10^{nb*9}$, of possible values is not subject to brute force attack. For a key which is 300 bytes long there are $2^{8*300}$ possible such data sequences. $2^{8*300}$ is about $10^{720}$, nb=80, which is a billion times a billion 80 times.

BRIEF DESCRIPTION OF THE DRAWINGS

The present subject matter may be further understood by reference to the following description taken in connection with the following drawings:

FIG. 4 is a timing diagram illustrating the operation of the embodiment of FIG. 3;

DETAILED DESCRIPTION

In accordance with the present subject matter, a sequence with an exponentially extremely long period is provided. A "non-linear" output sequence is provided in order to provide a uniform statistical distribution.

A random sequence of bytes is produced. The random data generator cyclically uses num_r random number generators, each of which has three parameters of length n bits (n=32 in the current example embodiment) with a chosen bit swap (out of nbs possible bit swaps) This increases the number of possible values produced to $2^{3*n*nbs*num\_r}$. In one form, where n=32 and num_r=6 and nbs=16, the number of possible values is $2^{9216}$. The value of $2^{9216}$ is approximately $10^{2764}$. This number may be compared to $10^{80}$, which is an approximation of the total number of atoms in the universe.

Additionally, the number of possibilities is increased by selecting one byte out of each cyclically generated 32-bit number, and providing permutations within the selected byte. The byte comprises y bits. Where y=8, there are 256!, 256 factorial, permutations of the byte. The input to the selected byte select unit is chosen from the n bit output of each random number generator. A group of y bits can be chosen from n bits (n>y) in (n!/((n−y)!*y!)) ways. Where n=32 and y=8, 32!/(24!*8!)=32*31*30*29*28*27*26*25/(8*7*6*5*4*3*2)=262,957,500.

Figure 1:
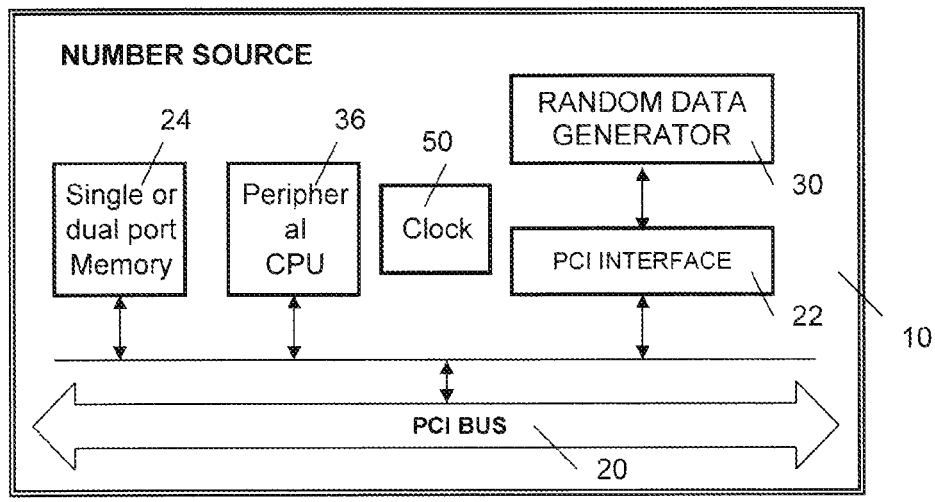
FIG. 1 is a block diagram of a number generator incorporating the present subject matter.

FIG. 1 is a block diagram of a number source 10 incorporating the present subject matter. The number source 10 is coupled to any digital bus such as the peripheral component interconnect (PCI) bus 20 for interaction with systems or subsystems utilizing a random byte stream. The number source 10 comprises a single or dual port memory 24, a random data generator 30, and a peripheral central processing unit (CPU) 36 coupled to the PCI bus 20. The PCI interface 22 couples a random data generator 30 to the PCI bus 20. A first-in, first-out (FIFO) buffer 38 may optionally be included in the random data generator 30 for coupling outputs to the PCI interface 22.

The dual port memory 24 receives numbers from the random data generator 30. The peripheral central processing unit (CPU) 36 commands and controls the operations described below. Timing is provided by a clock 50. The clock 50 defines successive operating cycles.

Briefly stated, the overall operation comprises loading the number generator 30, starting the number generator 30, pulling down a number from the number generator 30, and writing the number to the single or dual port memory 24.

Figure 2:
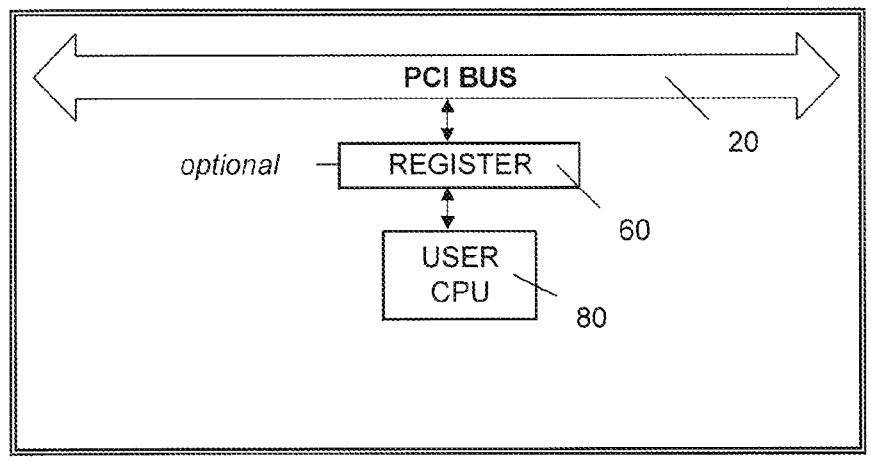
FIG. 2 is a block diagram illustrating provision of input information used to initiate random number generation.

FIG. 2 is a block diagram illustrating the provision of input information to the number source 10. A register 60 is optionally provided to communicate with the PCI bus 20. The register 60 includes locations for storing the number n of bits to be used per stage, the number m of cycles of random numbers that will be provided, and other input information as described below. The register 60 may be loaded from a user CPU 80 or other source capable of providing inputs. Alternately, the user CPU can communicate directly with random data generator 30 through a bus interface.

Figure 3:
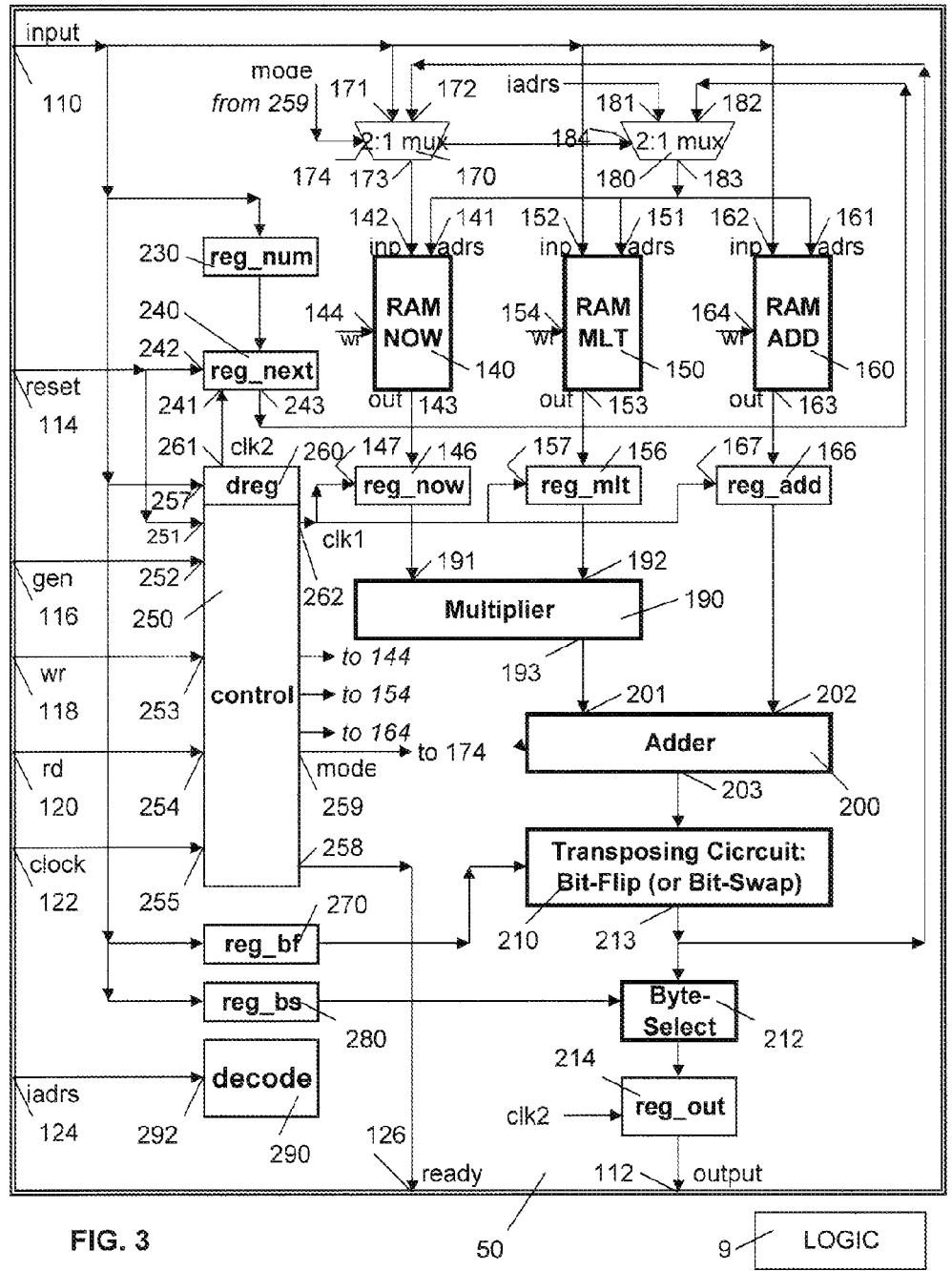
FIG. 3 is a more detailed block diagram of a number generator in the embodiment of FIG. 2.

FIG. 3 is a more detailed block diagram of the random data generator 30 in the embodiment of FIG. 2. FIG. 3 illustrates a hardware embodiment. Particular discrete components are illustrated for purposes of description. The particular elements illustrated could be included in one integrated circuit or may be distributed over a number of hardware elements. The present description also illustrates a non-transitory machine-readable medium which when executed on a processor commands a sequence of operations. The timing chart in FIG. 4 and a flow chart of FIG. 5 further describe the operations which are controlled by an external CPU. Operation is further discussed after recitation of the subject structure and relationship of actions performed in the course of operation.

The random data generator 30 has ports comprising an input terminal 110, an output terminal 112, a reset terminal 114, a generate terminal (gen) 116, a write terminal (wr) 118, a ready terminal (rd) 120, a clock terminal 122, and an address instruction (iadrs) terminal 124. This is exemplary, and other arrangements can be provided in accordance with the teachings below. Initial inputs to the input terminal 110 include a seed number for each random number generator in the RAM-NOW array 140 and a number num_r in register reg-num 230 indicative of the number of random number generators used.

Generated numbers and parameters are provided from each of three random access memories respectively denoted RAM-NOW 140, RAM-MLT 150, and RAM-ADD 160, collectively referred to as the RAMs 140-160. The RAM-NOW 140 is used to process a seed number. The RAM-MLT 150 is used in a multiplication process as part of creation of a random number. The RAM-ADD 160 is used in an adding process as part of creation of the random number.

The RAM-NOW 140 has an address pin 141, an input pin 142, and an output pin 143. The RAM-MLT 150 has an address pin 151, an input pin 152, and an output pin 153. The RAM-MLT 160 has an address pin 161, an input pin 162, and an output pin 163, each providing an output to a register. The output pins 143, 153, and 163 are connected to registers, each having a name beginning with "reg" for purposes of the present description. These output pins are respectively connected to reg-now 146, ref-mlt 156, and reg-add 166.

Signals are connected to the RAMs 140-160 in a manner described below from a first multiplexer 170 and a second multiplexer 180. The first multiplexer 170 has first and second signal terminals 171 and 172, an output terminal 173, and a control terminal 174. The second multiplexer 180 has first and second signal terminals 181 and 182, an output terminal 183, and a control terminal 184. The output terminal 173 of the first multiplexer 170 provides a data signal to the input terminal 142 of the first RAM-NOW 140. The output terminal 183 of the second multiplexer 180 is connected to the address terminals 141, 151, and 161 of the RAMs 140, 150, and 160 respectively.

The first and second registers 146 and 156 provide inputs to the input terminals 191 and 192 respectively of a multiplier 190, which performs a multiply operation as described with respect to FIG. 4. The multiplier 190 has an output terminal 193 providing a number to a first input 201 of adder 200. The third register 166 provides a signal to a second input terminal 202 of the adder 200. The adder 200 provides a number from a terminal 203 to a selectable bit swap module 210 as further described with respect to FIG. 4. Also, as further described below, the selectable bit swap module 210 will transpose selected bits of generated numbers as part of randomizing.

The selectable bit swap module 210 provides numbers from an output terminal 213 to a byte-select circuit 212. Output terminal 213 of the selectable bit swap module 210 is written back to the multiplexer 170 to become the new entry in the selected random generator parameter in RAM-NOW 140 for the next cycle of random byte generation. As further described below, the byte-select circuit 212 selects bits out of the number provided from the selectable bit swap module 210. The byte-select circuit 212 provides a number to an output register 214 which in turn provides the number to the output terminal 112.

A control circuit 250 includes a d-register 260. The control circuit 250 has a first input terminal 251 connected to the reset pin 114, a second input terminal 252 connected to the generator terminals 116, a third input terminal 253 connected to the write pin 118, and a fourth input terminal 254 connected to the ready pin 120. A clock terminal 255 is connected to the clock pin 122. The d-register 260 has a first output terminal 261 and a second output terminal 262. Control is also provided utilizing a register reg-bf 270, a register reg-bs 280, and a decode circuit 290 for selecting where to write the input 110.

Additional signal paths are as follows. The input terminal 110 is connected to the pin 171 of the multiplexer 170 and is also connected to the pins 152 and 162 of the RAMs 150 and 160 respectively. The input terminal 110 is also connected to inputs of the reg-num register 230, d-register 260, reg-bf register 270, and reg-bs register 280. The value m is loaded into the reg-num register 230.

The control circuit has a terminal 251 connected to the reset terminal 114. A terminal 252 is connected to the generate pin 116. A terminal 253 is connected to the write pin 118. A terminal 254 is connected to the ready pin 120, and a terminal 255 is connected to the clock pin 222. A terminal 258 is connected to the ready signal pin 126.

The d-register 260 has first output terminal 261 and a second output terminal 262. The output terminal 261 is connected to a first input terminal 241 of the reg-next register 240. A control terminal 242 receives an input from the reset pin 114. An output pin 243 is coupled to the input pin 182 of the multiplexer 180. A second output terminal 262 of the block 260 provides inputs to input terminals 147, 157, and 167 of the registers 146, 156, and 166 respectively. Iadrs pin 124 is connected to a terminal 292 of the decode circuit 290.

Figure 5A:
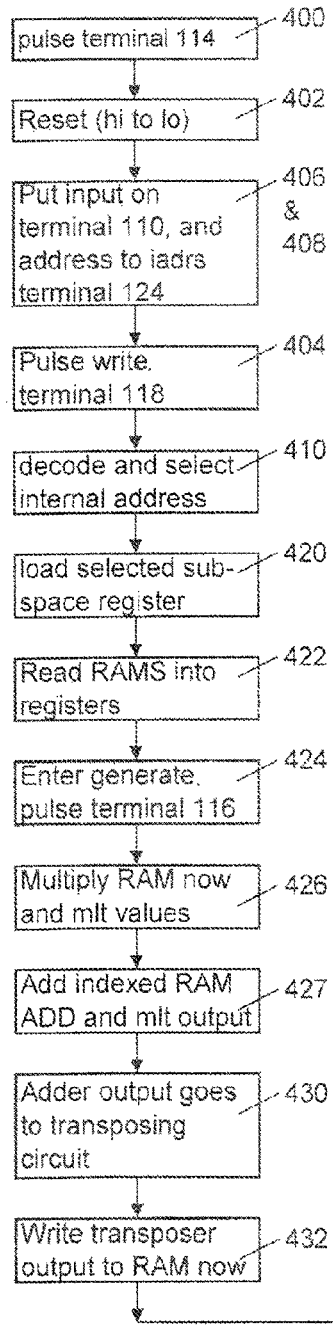
FIG. 5 is a flow diagram extending over FIG. 5A and FIG. 5B of the operation described with respect to FIG. 4.
Figure 5B:
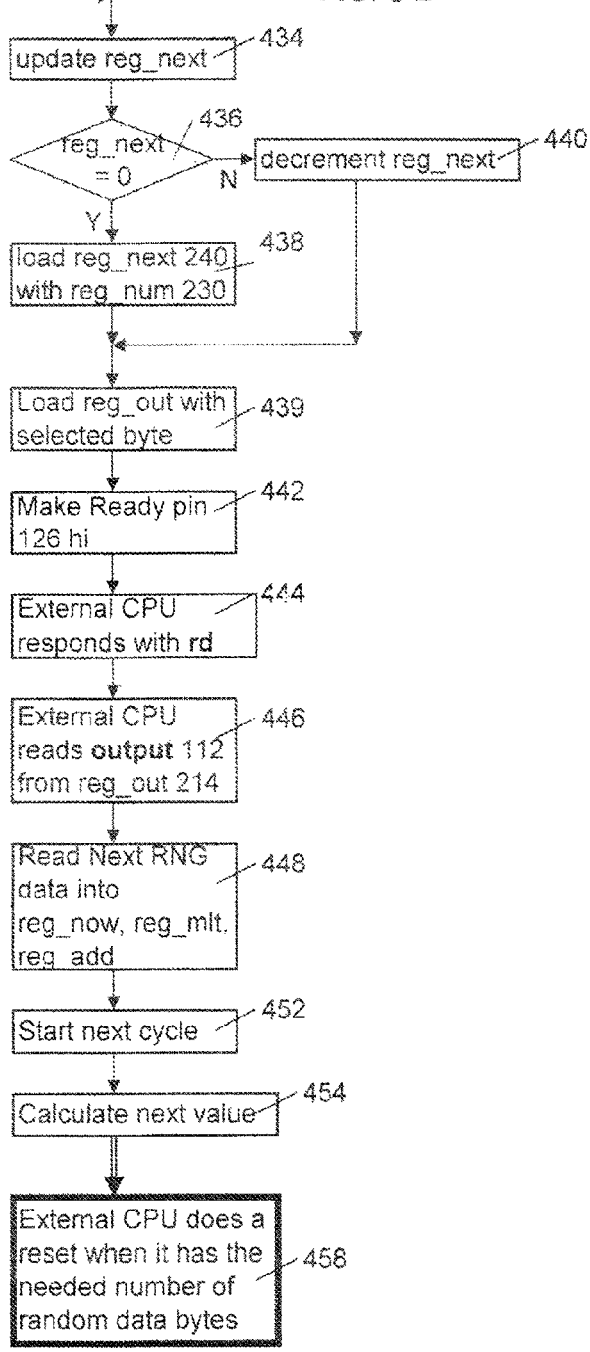

Operation is described with respect to FIG. 4 and FIG. 5. FIG. 4, consisting of FIGS. 4A through 4K, is a timing diagram illustrating the operation of the embodiment of FIG. 3. FIG. 5 is a flow diagram of the operation described with respect to FIG. 4. The flow diagram extends over FIG. 5A and FIG. 5B.

In FIG. 4 the abscissa is time, and the ordinate is signal amplitude in arbitrary units. The upper ordinate value corresponds to a digital "1." The value at the X axis (abscissa) corresponds to a digital "0." FIG. 4A represents the state at reset pin 114. FIG. 4B represents the input at the generate pin 116. FIG. 4C represents the input at the pin 174 of the multiplexer 170. FIG. 4D represents the input at the write pin 118. FIG. 4E represents the input at the iadrs pin 124. FIG. 4F represents the input at the input pin 110. FIG. 4G represents the output at terminal 261 of the register 260. FIG. 4H represents the output at terminal 262 of the register 260. FIG. 4I represents the signal at the output terminal 143 of the reg-next register 140. FIG. 4J represents the output at ready pin 146. FIG. 4K represents the ready input at the terminal 120. The components referred to are illustrated in FIG. 3.

The operating cycle is described beginning at block 400 in FIG. 5 with the receipt of a reset pulse at the time T1 (FIG. 4A). In the present exemplification, the pulse has a trailing edge occurring at time T2, block 404, which is responded to as is further described below. After the reset signal has returned to zero, the initial parameters can be loaded. At time T3, a pulse shown in FIG. 4D is initiated at the write terminal 118, block 404. The data to load is placed on the input pins 171, 152, and 162, and the input terminals of the registers 230, 260, and 280 (FIG. 4F) via the input terminal 110, block 406. The address of where to store the input data is placed on the iadrs pin 124 (FIG. 4E), block 408.

The multiplexer 170 will receive a seed value at the input terminal 171 to provide an initial value to the RAM-NOW 140. In a further portion of an operating cycle, the multiplexer 172 will provide value to the RAM-NOW 140 supplied from the selectable bit swap module 210. Similarly, the RAM-MLT 150 and the RAM-ADD 160 are loaded with the initial seed value.

The reg-num register 230 is loaded with the value m. The d-register 260 is loaded with a number to control timing of the registers 146, 156, and 166. The reg-bf register 270 is loaded with a number to control the bit swapping algorithm in the selectable bit swap circuit 210. The reg-bs is loaded with a number to control permutations of the pipe-select circuit 212.

An internal address space is selected by utilizing a two-bit iadrs number, block 410. The internal address space comprises four sub-spaces. A first sub-space, called the control sub-space, comprises the control circuit 250 and registers 230, 270, 280, and 290. A second control sub-space is called RAM-NOW and comprises the register array RAM-NOW 140. A third control sub-space comprising the register array RAM-MLT 150, is called RAM-MLT control sub-space. A fourth control sub-space, referred to as RAM-ADD, comprises the register array RAM-ADD 160. Each initial number, per register array, in the RAM-NOW sub-space is referred to as a seed value for the random generator.

At block 420, control subspace registers are loaded. The control sub-space comprises the registers 230, 250, 270, and 280. The register 230 is loaded with the actual number m of cycles to be included in a random generator sequence, block 412. For each sequence, the operations of FIGS. 4A through 4K are repeated. The register reg-bf 270 is loaded with a value to control multiplexers within the selectable bit swap module 210. An alternate embodiment can have an additional register array or RAM named RAM-BF which would change the contents of register reg-bf 270 as a function of the current random generator selected by reg-next register 240.

Control register 280 is loaded with a value to control multiplexers included in the byte-select block 212. In alternative implementations having RAM-BF and RAM-BS, the iadrs number would comprise an additional bit to select the two additional RAM spaces. A fourth control register, the reg-div register 160 is used to divide the clock signal from pin 142 into clk1 and clk2 pulses (FIGS. 4G, 4H, and 4I) to allow for the delay for the calculated value to propagate through the multiplier 190, the adder 200, and the selectable bit swap module 210.

After entering the generate mode, block 424, (FIG. 4B and FIG. 4C) the RAMs 140, 150, and 160 are respectively read into their corresponding registers 146, 156, and 166. At block 426, the contents of the registers 146 and 156 propagate through the multiplier 190. The output of the multiplier 190 propagates to the input terminal 201 of the adder circuit 200. While the output of the registers 166 propagates to the input terminal 202 of the adder 200. The output of the adder 200 propagates through the selectable bit swap module 210 which in turn propagates through the byte-select circuit 212, block 430.

At a preselected time, a clk2 signal is generated which causes the output of the bit swapping unit 210 to be written back to the RAM-NOW 140 as selected by the as yet unchanged reg-next value from reg-next register 240, block 432. The preselected time is determined by a number of external clock pulses determined by the reg-div register 260. The clk2 signal (FIG. 4H) causes the reg-out register 214 to be loaded with the output of the byte-select circuit 212. After the bit swapping output 213 has been written into the RAM-NOW 140, the trailing edge of the clk2 signal will cause the reg-next register 240 to be updated, block 434.

In the generate mode, at block 434 the mechanism for the updating of the reg-next register 240 is as follows. If this value is zero, then the reg-next register 240 is loaded with the value of the register 230, block 438. Otherwise, the reg-next register 240 is decremented, block 440. In an alternative implementation, the reg-next register 240 can be incremented, and set to zero when it is equal to the number in the register 230. External logic, e.g., in the control circuit 250, detects when there is a pulse on the ready pin 120 (FIG. 4J), block 444. When the ready pin 120 is active, it will read a current byte in the reg-out register 214 and from the output pin 112, block 446. The ready pin 120 will be pulsed (FIG. 4K). This will cause the next clk1 signal to read the next, cyclical random generator parameters by applying inputs to the input terminals 147, 157, and 167 of the registers 146, 156, and 166 respectively. This will cause the next clk1 signal to read the next, cyclical random generator parameters.

Operations proceed to time t1 of a next operating cycle, block 452. The content of the RAM-NOW 140 is now the random value of the random data generator 30. Subsequent values are calculated by multiplying the value of the reg-now register 146 and adding this product to the value in reg-add register 166, block 454. Bits from the result are transposed in the selectable bit swap module 210 as described with respect to FIG. 6 below, block 456. The byte-select circuit 212 selects eight bits from the output of the selectable bit swap module 210 in a manner described with respect to FIG. 8.

At the end of the generate mode, the values in the RAMs 140, 150, and 160 and the registers 146, 156, and 166 containing values, have already served their purposes. For purposes of security, a reset pulse is provided to write zero values into each of these components, block 460.

Figure 6:
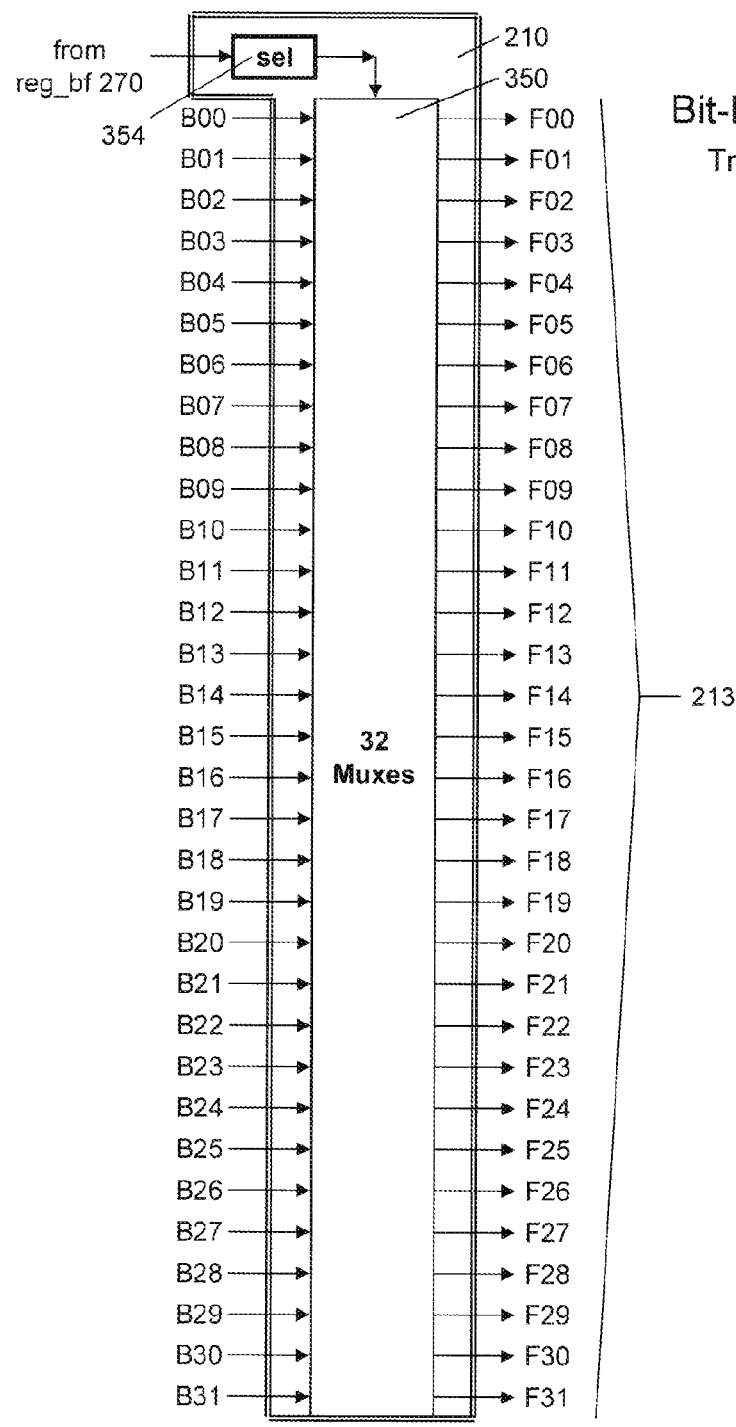
FIG. 6 is a block diagram of a general form of a module for swapping bits using n multiplexers (n=32 in this embodiment) to select a specific transposition in the embodiment of FIG. 3.

FIG. 6 is a block diagram of a first form of the selectable bit swap module 210 for repositioning bits in the embodiment of FIG. 3. The repositioning is used to make the randomly generated byte streams have a statistically uniform distribution. A fixed stride in the randomly generated byte sequence will not have any given byte value reoccur more than about one in 456 times. Banding of results is avoided.

In the illustrated embodiments of FIGS. 6 and 7, the repositioning could comprise virtually any form of repositioning. The selectable bit swap module 210 has $1^{st}$ through $32^{nd}$ data bit input terminals B00 through B31, collectively referred to as Input Terminals B. Each of the input terminals B00 through B31 receives an output from the adder 200. The selectable bit swap module 210 has $1^{st}$ through $32^{nd}$ data bit output terminals F00 through F31, collectively referred to as Output Terminals F. The input terminals B are selectively coupled to the Output Terminals F to change the order of bits in any of a number of ways.

For example, in the embodiment of FIG. 4G, input terminal B00 is connected to output terminal F31. Input terminal B01 is connected to output terminal F01. For a 32-bit register, the value $F_v$ of the suffix of each F terminal may be expressed as $F_v=31-B_v$, where $B_v$ is the number of the input terminal B to which the output terminal F is connected.

Other fixed repositioning implementations may be provided. Examples include an even-odd swap, nibble swap, and other permutations. The one permutation that should not be included is "no change."

FIG. 6 is a block diagram of the general or controllable form of the selectable bit swap (or bit flip) module 210 for repositioning bits in the embodiment of FIG. 3. In this embodiment, rather than hardwiring a given input terminal B to a given output terminal F, a set of multiplexers 350 is connected to each input terminal B to switch the input to the selected output terminal F. A decode or selection circuit 354 chooses a predetermined connection pattern uniquely associated with the current number from reg-bf 270 input to the selection circuit 354. No input is used twice to another output for any given multiplexer setting.

Figure 7A:
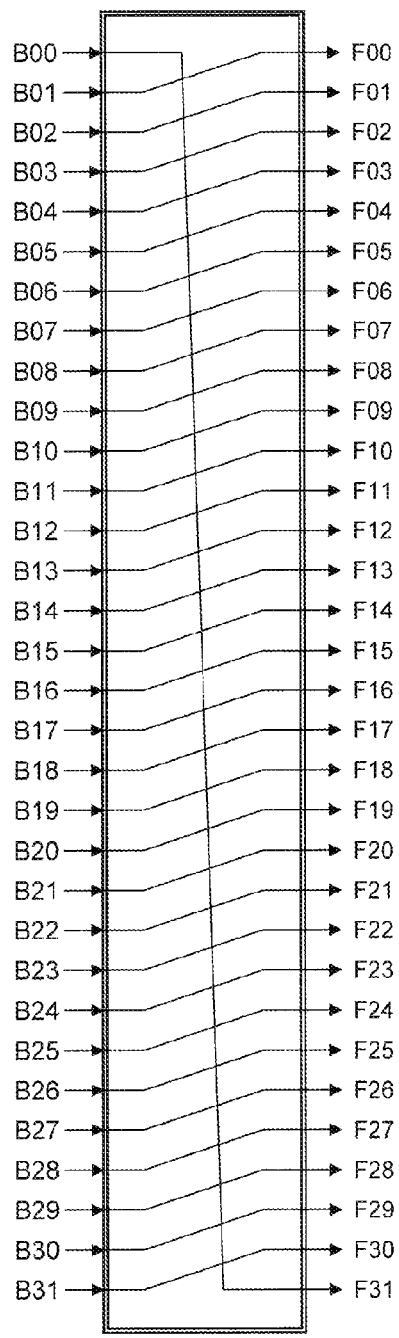
FIG. 7, consisting of FIGS. 7A, 7B, 7C, 7D, 7E, 7F, 7G, and 7H, contains block diagrams of specific example forms of a module swapping bits in the embodiment of FIG. 3 chosen by the contents of the "sel" register in FIG. 6 to control the n multiplexors.
Figure 7B:
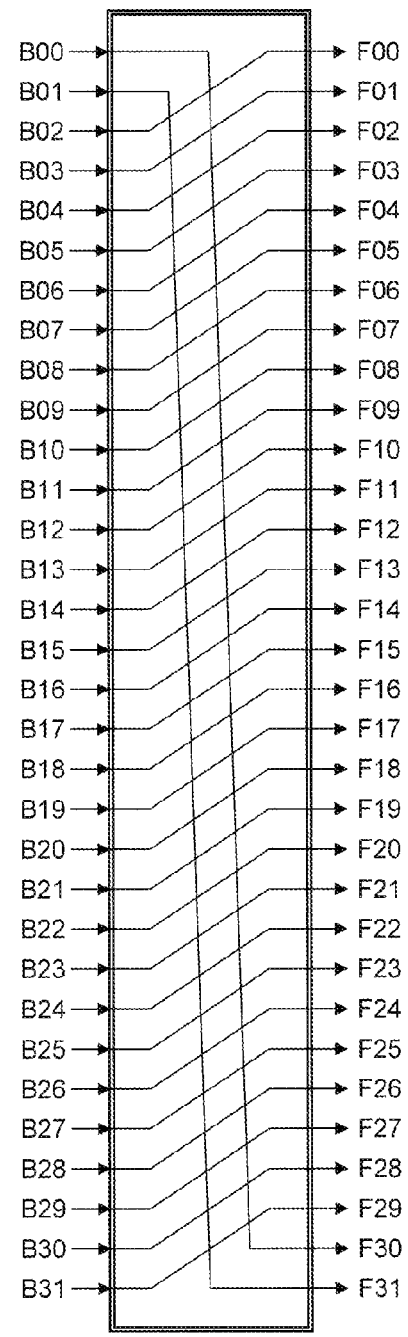
Figure 7C:
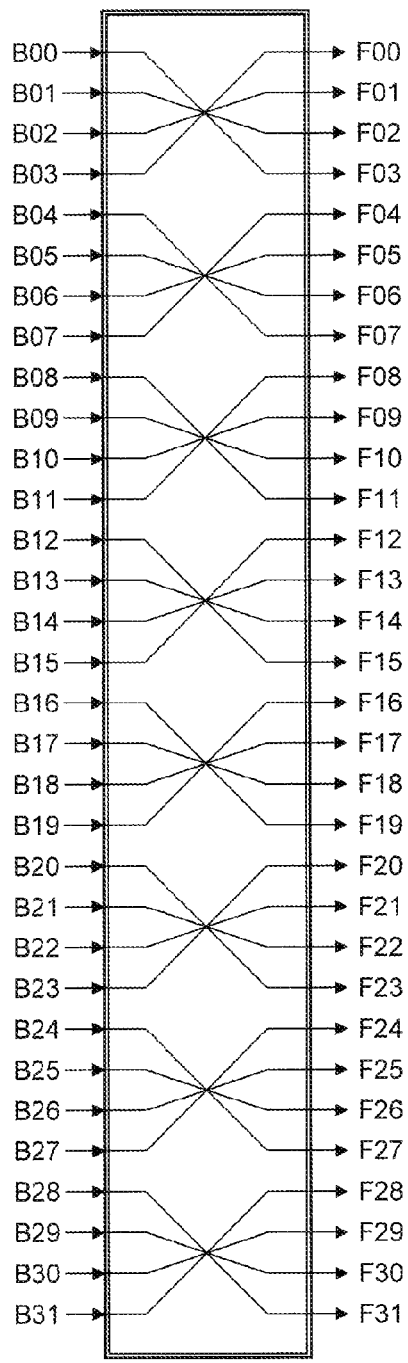
Figure 7D:
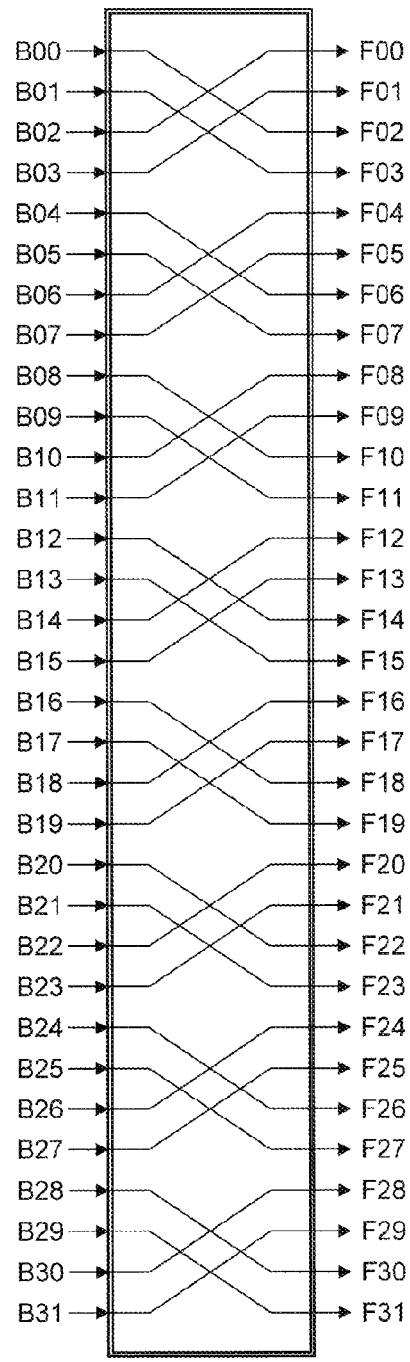
Figure 7E:
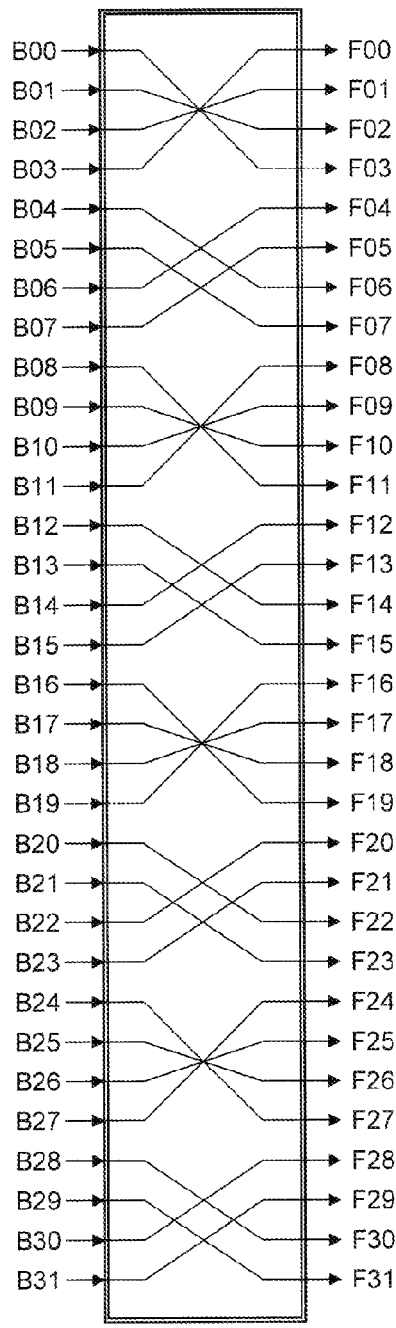
Figure 7F:
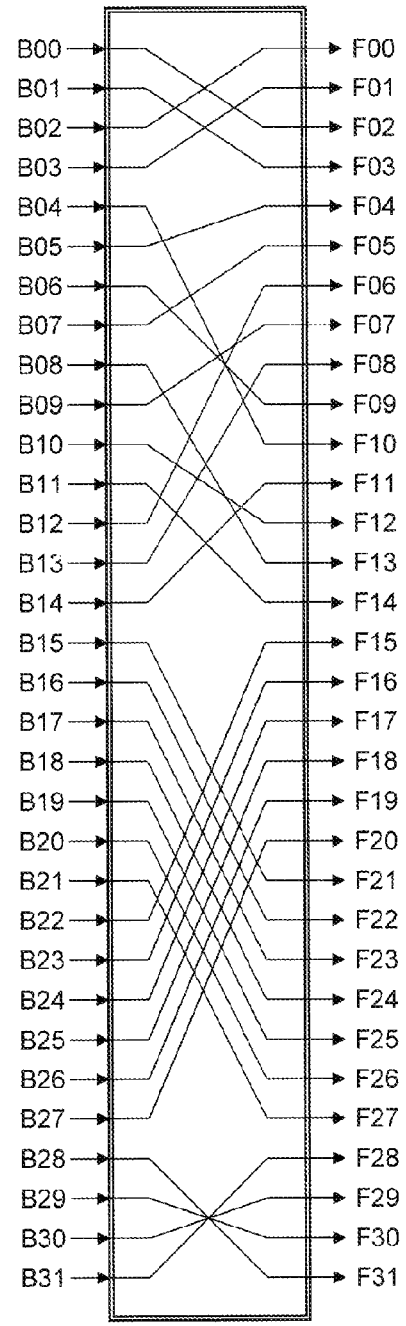
Figure 7G:
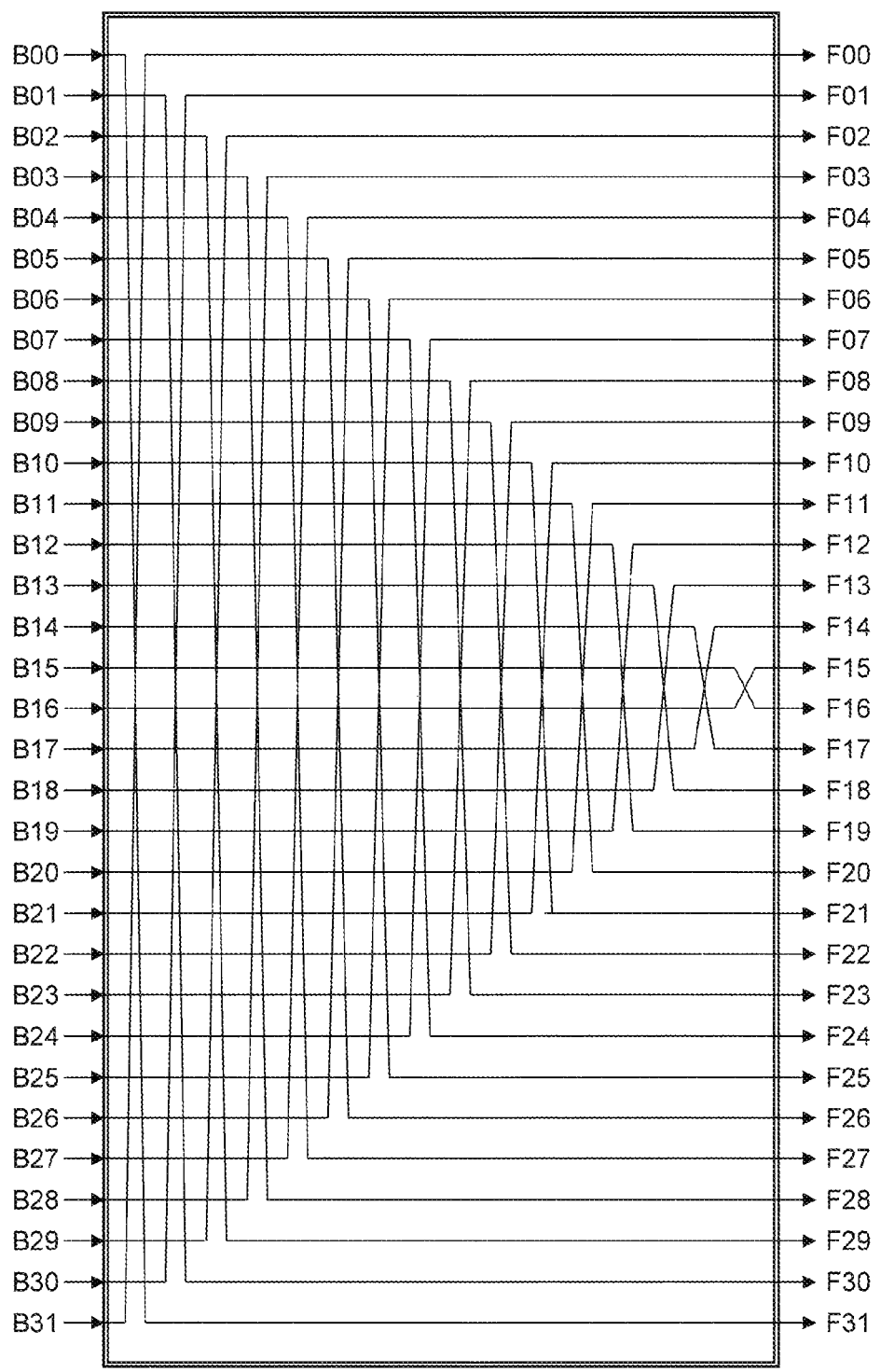
Figure 7H:
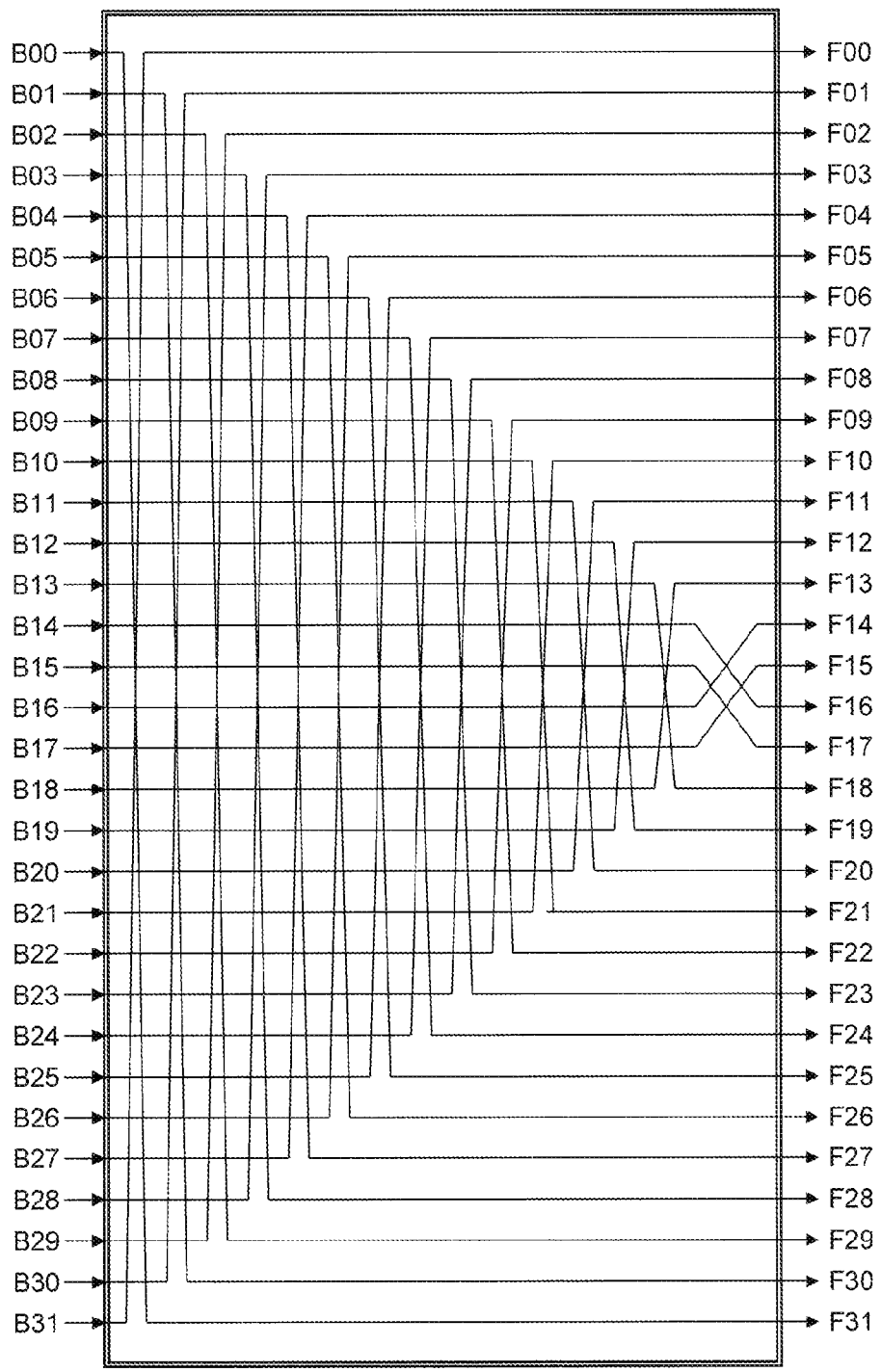

FIG. 7, consisting of FIGS. 7A, 7B, 7C, 7D, 7E, 7F, 7G, and 7H, contains block diagrams of specific example forms of a module for swapping bits in the embodiment of FIG. 3. In each embodiment in FIG. 7 a fixed transposition pattern is provided. FIGS. 7A and 7B show a mechanism for shifting the bytes order by one or two places respectively. In FIGS. 7C, 7D, and 7E, bits are divided into groups of four, and transpositions occur within each group. In the embodiment of FIG. 7F, groups of bits of different sizes are selected. In FIG. 7F, the groups comprise 4, 12, 8, and 4 terminals. FIG. 7G illustrates transposition across the entire range of bits.

Figure 8:
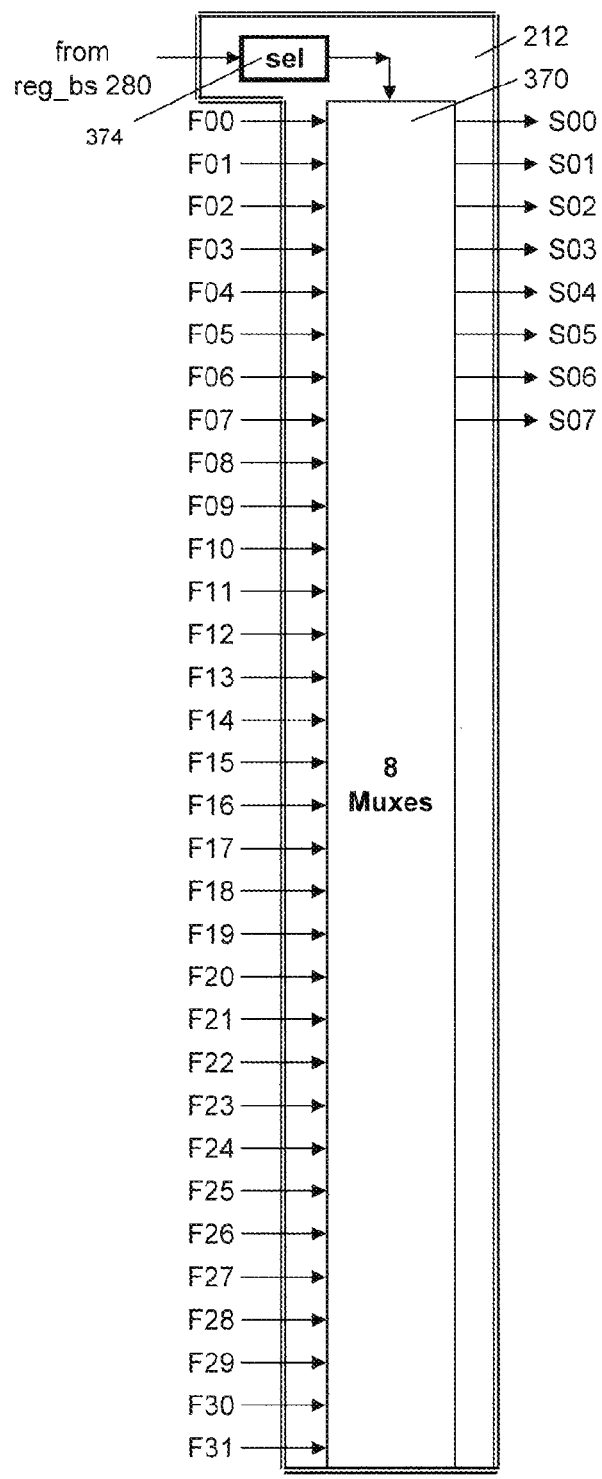
FIG. 8 is a block diagram of a general form of a byte selection module using 8 multiplexers to select specific bytes in the embodiment of FIG. 3.

FIG. 8 is a block diagram of an exemplary form of byte-select circuit 212 in the embodiment of FIG. 3. A plurality of multiplexers are included in the multiplexer unit 370. A multiplexer is selected by a select circuit 374 to couple one group of transposed bits to output terminals S00 through S08.

Other forms could be provided in accordance with the teachings herein. In both FIGS. 8 and 9, input terminals are named to correspond with the output terminals of the selectable bit swap module 210 (FIG. 3) with which they are connected. Eight output terminals, S00 through S07, are provided, as shown in FIG. 8. In alternative embodiments, other numbers of output terminals could be provided.

Figure 9A:
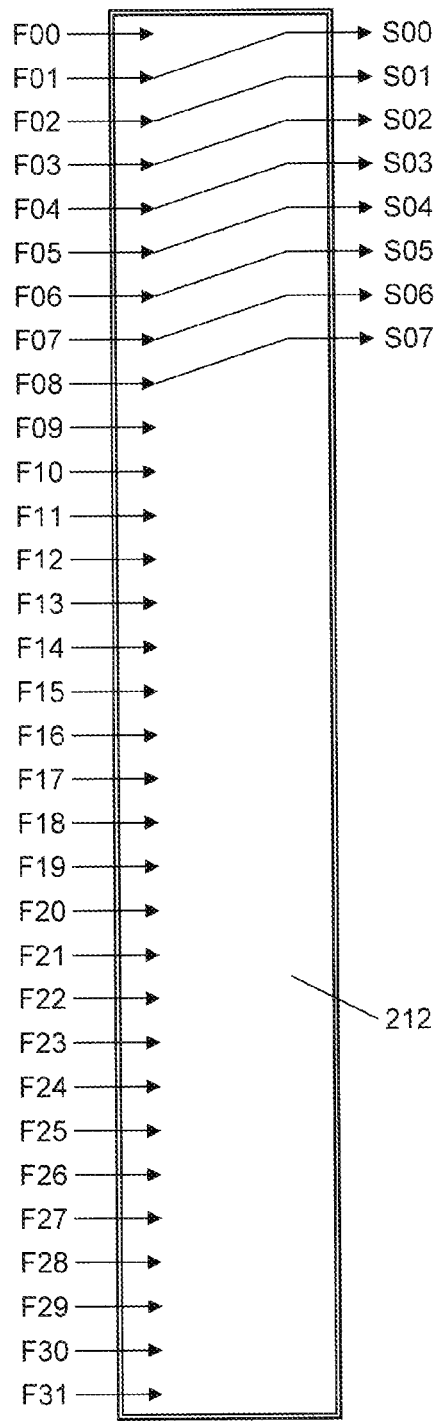
FIG. 9, consisting of FIGS. 9A, 9B, and 9C, is a block diagram of forms of a hard wired byte selection module. The bit select is chosen by the contents of the "sel" register in FIG. 8 to control the y multiplexors.
Figure 9B:
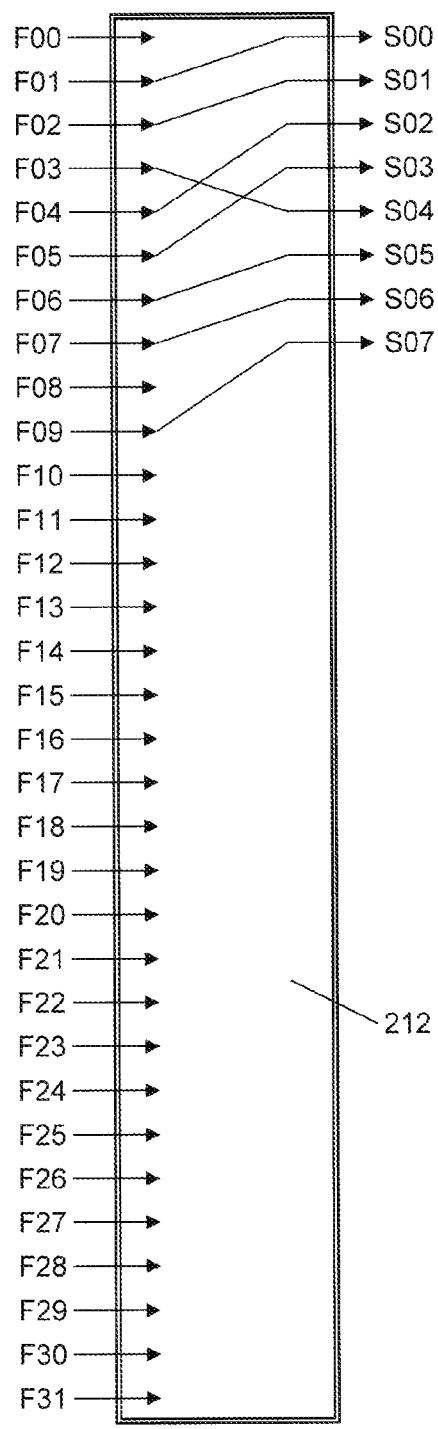
Figure 9C:
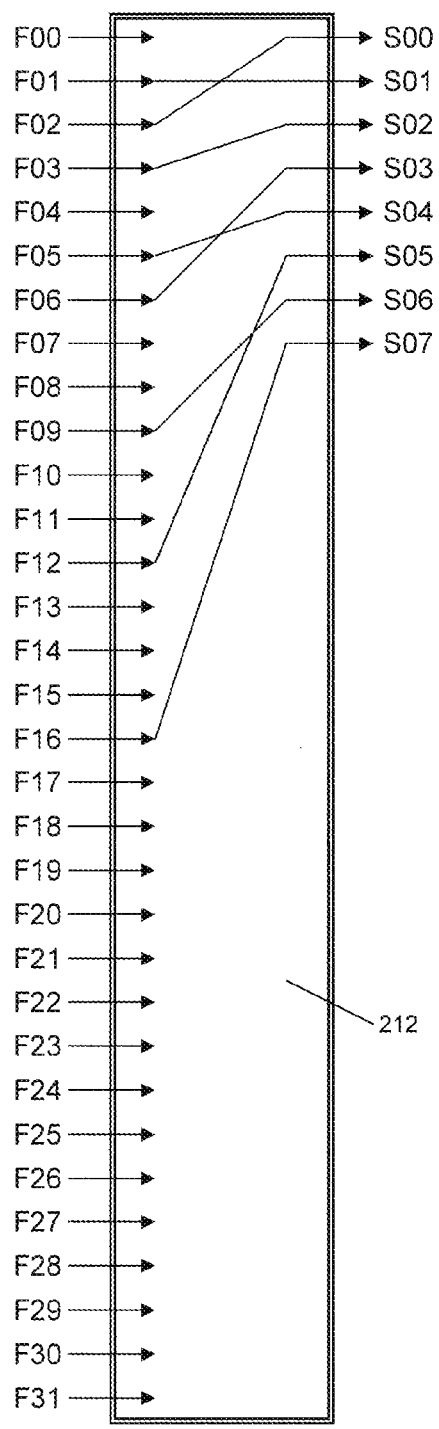

FIGS. 9A, 9B, and 9C are block diagrams of byte selections that byte-select circuit 212 could implement in the embodiment of FIG. 3. FIG. 9 represents a generalized illustration, and is exemplary and not limiting.

In the embodiment of FIG. 9, selected F terminals are each connected to one of the output terminals S00 through S07. A set of eight multiplexers 370 interconnects a different F terminal to one of the output terminals, S00 through S07. There is a one-to-one correspondence between each set of connections and a number provided from a decoder selection circuit 374. The selection circuit 374 receives a number from the reg-bs register 380 (FIG. 6). In an alternative implementation, an additional register array or RAM named RAM-BS would be used to load reg-bs register 380 with a value that is a function of the current random generator selected by reg-next register 240 (FIG. 3).

By utilizing further stages, each constructed in accordance with FIG. 3, keys of virtually unlimited length may be provided.

Optional embodiments claimed include cases where the "sel" registers for the bit swap (or bit flip in FIG. 6) unit and byte select unit (in FIG. 8) are themselves in a RAM array, each with an output register reg-bf and reg-bs, with a potentially different value for each of the num_r random data generators. These two optional RAM arrays (named bit_flip and byte_sel) would add two additional address spaces requiring an extra bit in the "iadrs" input in FIG. 3. These two optional RAM arrays would further increase the exponential number of possible random byte sequences.

The present subject matter is used in the context of any encryption algorithm such as the "Anti-Statistical Block Encryption" (ASBE) algorithm. This algorithm is designed to defeat Differential Cryptanalysis. Briefly, this algorithm is described as anti-statistical plus key-dependent block encryption with variable or scaling-key length. The present subject matter and random number generation is well-suited to this methodology.

There are many important attributes of ASBE. ASBE keys and passwords are created, used, and destroyed at each endpoint. ASBE is NSA reviewed, BIS approved for export, OFAC compliant, as well as HIPAA, HITECH, and FDA compliant. The algorithm is not subject to attack models and methods of cryptanalysis. Byte frequency cannot be used against it. A mathematical approach of factoring, ECDLP, or similar analysis cannot be used against the algorithm, which uses a sequence of non-linear steps and exhibits no periodic repetition. Key generation, communication, and storage cannot be detected or intercepted. Parameter-controlled keys are generated, used, destroyed, and recreated on demand. Key transfer between end points is not necessary. The encryption engine scrubs memory before exiting so the key, password, and other parameters are not available to be discovered by another program, which allocates all available memory to examine its contents. Passwords scale to 64K bytes in length. ASBE always produces different ciphertext with varying length, even when repeating the same data input, same key, and same password.

The invention claimed is:

1. A random data generator comprising: a variable and selectable quantity, num_r, of random number generators each coupled to receive inputs comprising seed numbers and generating an output stream of n bit numbers; a bit-swap module receiving each n-bit number and reordering the bits of a respective n-bit number to provide a reordered n-bit number now[k], the number of bits reordered defining a value nbs; a byte select circuit selecting a byte from the reordered n-bit number and providing a selected byte as an output to define a key or password, wherein the seed values are now[k], mlt[k], add[k], where k is the range 0 to num r−1 and where num r equals a number of random number generators and wherein a circuit is coupled to update the value of now[k] to produce a next n-bit number now[k] wherein the update comprises producing a first term as a function of now[k]*mlt[k], producing a second term in correspondence with add[k], and adding the first term and the second term.

2. A random data generator according to claim 1, wherein each of said num r random data generators is selectively connectable to be independently controlled to select a bit reordering and byte select for each respective random data generator for each operating cycle, whereby non-linear bit reordering and byte select provides generated random data having good statistical properties, the updated value of now [k] comprising the reordered n-bit number now[k].

3. A random data generator according to claim 2 further comprising a reg-num register operatively coupled to the random number generator for establishing a preselected number of operating cycles, and wherein the reg-num register is coupled to periodically reset the random number generator input numbers, and begin a next operating cycle and wherein the preselected number defines the number of operating cycles in an operating sequence, a number of random number generators in a random data generator is defined by the loaded number, num_r, in a register.

4. A random data generator according to claim 3 wherein each random number generator comprises first memory RAM-NOW value, second memory RAM-MLT value, and a third memory RAM-ADD value, the first memory RAM-NOW and the second memory RAM-MLT value are coupled to provide inputs to a multiplier, and an output of the multiplier and the third memory RAM-ADD value are coupled to provide inputs to an adder, the number produced by the adder comprising an n-bit number.

5. A random data generator according to claim 4 wherein a number of random number generators in the random data generator is equal to num_r, wherein num_r≥1.

6. A random data generator according to claim 5 wherein the bit-swap module comprises a switching circuit having a preselected number of states each defining a set of bit transpositions and wherein the inputs further comprise a number operatively coupled to the switching circuit to define a current state.

7. A random data generator according to claim 6 wherein the byte select circuit comprises a switching circuit having a preselected number of states each defining a set of bits selected from now[k] and wherein the inputs further comprise a number operatively coupled to the byte select circuit to define a current state.

8. A method for generating a random data stream comprising: providing an initial set of seed numbers to a random number generator; generating by the random number generator an output stream of n bit numbers; reordering the bits of a respective n-bit number to provide a reordered n-bit number now[k], the pattern of bits reordered being defined by a value in the range of 0 to nbf-1, wherein the seed values are now[k], mlt[k], add[k], where k is the range 0 to num r−1 and where num r equals a number of random generators, and updating the value of now[k] to produce a next n-bit number now[k] wherein the step of updating comprises producing a first term as a function of now[k]*mlt[k], producing a second term in correspondence with add[k], and adding the first term and the second term.

9. A method according to claim 8 comprising the step of selecting a byte from the reordered n-bit number in a pattern as defined by a value in the range of 0 to nbf-1 where nbf is the maximum of bit swaps implemented out of a possible number n! (factorial) and providing the selected byte as an output to the random data stream, and selectively controlling each of said num r random data generators independently and selecting a bit reordering and byte select for each respective random data generator for each operating cycle, whereby non-linear bit reordering and byte select provides generated random data having good statistical properties, the updated value of now [k] comprising the reordered n-bit number now[k].

10. A method according to claim 9 wherein the seed values are now[k], mlt[k], add[k], where k is the range 0 to num_r−1 and comprising the step of establishing a number r of operating cycles in an operating sequence and coupling a current value of now[k] to update the values of now[k], mlt[k], add[k] to produce a next n-bit number now [k].

11. A method according to claim 10 further comprising establishing a preselected number of operating cycles of the random number generator, and periodically resetting the random number generator input numbers to begin a next operating cycle and establishing an operating sequence comprising the preselected number of operating cycles.

12. A method according to claim 11 comprising providing in the random number generator a first memory RAM-NOW value, a second memory RAM-MLT value, and a third memory RAM-ADD value, multiplying current values in memory RAM-NOW value and in memory RAM-MLT value to provide a product, adding the product to a value in memory RAM-ADD to produce the n-bit number.

13. A method according to claim 12 comprising providing a RAM array containing a bit-swap value for each random number generator.

14. A method according to claim 13 comprising providing in the bit-swap module a switching circuit having a preselected number of states each defining a set of bit transpositions and selecting one state for each operating cycle.

15. A method according to claim 14 comprising providing a RAM array containing a byte select value for each random number generator.

16. A non-transitory machine-readable medium that provides instructions, which when executed by a processor, causes said processor to perform operations comprising: providing an initial set of seed numbers to a plurality of random number generators; generating by each random number generator an output stream of n bit numbers; reordering the bits of a respective n-bit number to provide a reordered n-bit number now[k], the number of bits reordered defining a value nbs; selecting a byte from the reordered n-bit number and providing a selected byte as an output to define a key or password, wherein the seed values are now[k], mlt[k], add[k], where k is the range 0 to num r−1 and where num r equals the number of random number generators, and updating the value of now[k] to produce a next n-bit number now[k] wherein the step of updating comprises producing a first term as a function of now[k]*mlt[k], producing a second term in correspondence with add[k], and adding the first term and second term.

17. A non-transitory machine-readable medium according to claim 16, said further providing instructions for selectively controlling num r random number generators independently and selecting a bit reordering and byte select for each respective random number data generator, whereby non-linear bit reordering and byte select provides generated random data having good statistical properties, the updated value of now [k] comprising the reordered n-bit number now [k].

18. A non-transitory machine-readable medium according to claim 17 wherein the medium further causes said processor to perform operations comprising establishing a preselected number of operating cycles of the random number generator, and periodically resetting the random number generator input numbers to begin a next operating cycle and establishing an operating sequence comprising the preselected number of operating cycles.

19. A non-transitory machine-readable medium according to claim 18 wherein the medium causes said processor to perform operations comprising providing in the random number generator a first memory RAM-NOW, a second memory RAM-MLT, and a third memory RAM-ADD, multiplying current values in memory RAM-NOW and in memory RAM-MLT to provide a product, adding the product to a value in memory RAM-ADD to produce the n-bit number, wherein an updated value of now[k] equals bit_swap(now[k]*mlt[k]+add[k]).

20. A non-transitory machine-readable medium according to claim 19 wherein the medium further causes said processor to perform operations comprising providing a plurality of random number generators wherein a number of random number generators in the random data generator is equal to num_r, and wherein num_r≥1.

21. A non-transitory machine-readable medium according to claim 20 wherein the medium further causes said processor to perform operations comprising providing in the bit-swap module a switching circuit having a preselected number of states each defining a set of bit transpositions and selecting one state for each operating cycle and providing in the byte select circuit a switching circuit having a preselected number of states each defining a set of bytes selected from now[k] and selecting one state for each operating cycle.

* * * * *